United States Patent [19]
Dalla Bona et al.

[11] Patent Number: 4,775,174
[45] Date of Patent: Oct. 4, 1988

[54] FLUID CONNECTOR

[75] Inventors: Alfredo Dalla Bona, Abbiategrasso; Attilio Airaghi, Cornaredo, both of Italy

[73] Assignee: Murray Europe S.p.A., Cusago, Italy

[21] Appl. No.: 68,025

[22] Filed: Jun. 29, 1987

[30] Foreign Application Priority Data

Nov. 3, 1986 [IT] Italy ............... 23574/86[U]

[51] Int. Cl.[4] .............................................. F16L 41/00
[52] U.S. Cl. .................................................... 285/190
[58] Field of Search ........................ 285/190, 273, 281

[56] References Cited

U.S. PATENT DOCUMENTS

| | | | |
|---|---|---|---|
| 608,852 | 8/1898 | Goss | 285/190 |
| 712,738 | 11/1902 | Stevens | 285/190 |
| 3,905,450 | 9/1975 | Persson | 285/190 X |
| 4,585,256 | 4/1986 | Rassieur et al. | 285/190 |
| 4,672,998 | 6/1987 | Kozak, III | 285/190 X |
| 4,679,829 | 7/1987 | Yanagisawa | 285/190 |

Primary Examiner—Mark J. Thronson
Attorney, Agent, or Firm—Bucknam and Archer

[57] ABSTRACT

A fluid connector is provided which is especially adapted for use with low-pressure fluids. The fluid connector comprises a bored mobile joint possessing an internal chamber communicating with a tubular conduit and upper and lower coaxial, opposed bore-holes whose common axis is substantially perpendicular to said tubular conduit. A screw brace is inserted into said bore-holes. The leg portion of the screw brace possesses an internal conduit which is co-axial with the common axis of the bore-holes and which communicates with the internal chamber, said leg portion further possessing upper and lower annular grooves and a threaded portion starting below the lower annular groove. A metallic retaining ring is positioned below the upper bore-hole and is disposed within the upper annular groove. Upper and lower flexible, elastomeric sealing rings are positioned, respectively, above the upper bore-hole and below the lower bore-hole, the upper of said rings being seated within a housing defined upon the upper side of the upper bore-hole and the lower of said rings being partly seated within a housing defined upon the lower side of the lower bore-hole and partly within said lower annular groove.

1 Claim, 1 Drawing Sheet

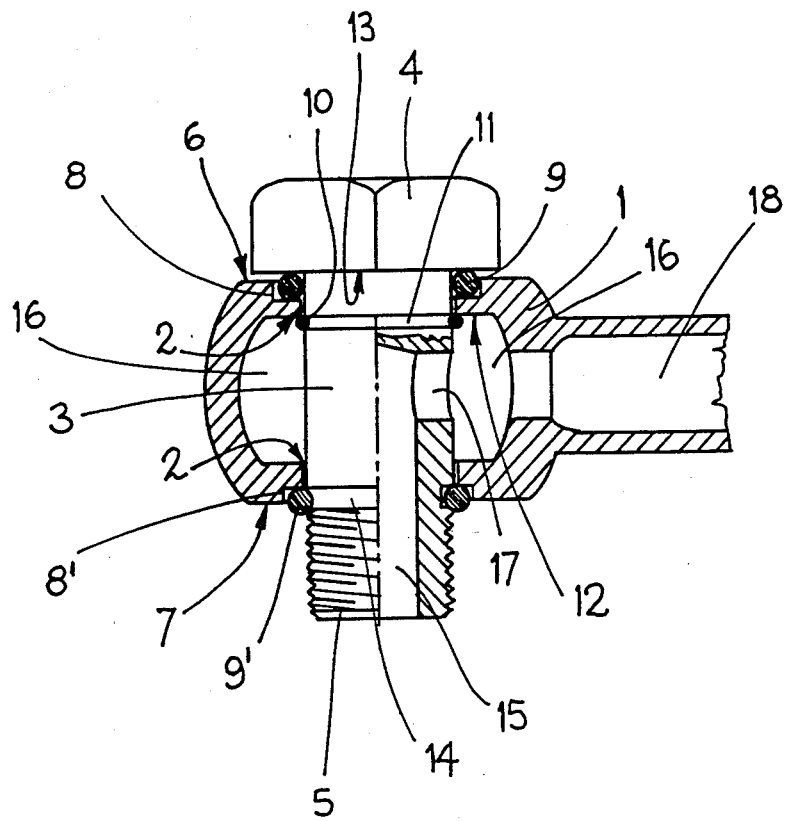

FLUID CONNECTOR

BACKGROUND OF THE INVENTION

1. Field of the Invention

This invention relates to a connector for fluids. More precisely, this invention provides a connector for the transmission of low-pressure fluids.

2. Description of the Prior Art

It is known that within many areas of industry, and in particular the automobile industry, systems for the transmission of low-pressure fluids are currently in use.

This system's capacity for transmission is guaranteed by way of a fastened brace attached to a screw that compresses the joint or eye-shaped connector between two tempered copper washers.

In this way, a rigid joint is created that prevents the fluids inside to escape.

The above-described type of joint, while being fairly satisfactory from the functional point of view, does however have the disadvantage of requiring a pair of strong fastenings, and manual dexterity on the part of the operator who, in the mounting phase, must assemble with great care and skill the various parts one with another before beginning the installation.

It follows from this that the assembly and installation of the known type of joint takes a long time and that a fluid-tight seal is not always perfectly achieved.

SUMMARY OF THE INVENTION

This invention overcomes the above-mentioned disadvantages by providing a fluid connector whose different parts are pre-assembled and ready for immediate use.

According to this invention, a fluid connector, particularly one for the transmission of fluids at low pressure, having the above-mentioned characteristics, comprises:

(a) a bored, mobile eye-shaped joint with an internal space, a tubular conduit at the side fixed to the said joint and opening into the said internal space, two bore-holes passing co-axially and oppositely whose common axis is substantially perpendicular to that of the tubular conduit;

(b) a screw brace inserted into the bore-holes passing into the joint whose leg has a central co-axial conduit with the axis of the said bore-holes and communicating with the said internal space by means of at least one transverse bore-hole; and, (c) flexible fluid-tight rings inserted into the screw brace and placed respectively one above and one below the aforementioned bore-holes.

The ring washers are preferably made of elastic material having circular sections.

The fluid connector of the present invention has the following advantages:

(A) All of the component parts of the connector are pre-assembled and ready for immediate use. Thus, the operations are facilitated and the installation time is reduced.

(B) The fluid-tightness of the various components is assured by the flexibility and elasticity and adherence of the elastic rings which are made of elastic material or the like.

(C) The installation of the connector no longer requires a pair of strong braces because fluid-tightness is assured by the elastic rings.

BRIEF DESCRIPTION OF THE DRAWING

The constructional and functional characteristics of this invention can be better understood from the following detailed description which refers to the attached illustration which shows a schematic view of a transverse section of one form of the connector of this invention.

DESCRIPTION OF THE PREFERRED EMBODIMENT

With reference to the FIGURE, the fluid connector of this invention includes an eye-shaped mobile joint 1, in the passing parallel bore-holes 2, in which is inserted the body 3, of a screw. The head of the screw 4, (preferably a facet-headed type) and the bottom threaded end 5, both respectively projecting forth from opposite parallel planes 6 and 7 of the joint 1.

On planes 6 and 7, in proximity to the edges of said passing bore-holes 2, are impressed ring-shaped seatings 8 and 8' where the elastic rings are inserted, (preferably circular in section) 9 and 9'.

The screw, inserted into the parallel bore-holes 2, remains in its pre-assembly position through a retaining ring of metallic retaining ring 10, which is disposed in an annual groove 11, located on the body 3 of the screw in proximity to the upper internal face 12 the joint 1 adjacent to the external face 6. In this position, the lower face 13 of the head 4 remains substantially adjacent to the parallel face 6 of the joint 1, holding in its position 8, the elastic ring 9. The elastic 9', besides being contained in its ring-shaped housing 8', works in conjunction with a groove 14 applied to the body 3 of the screw at the initial point of the threading 5, substantially corresponding to the external facing 7.

The elastic rings 9 and 9' are preferably of the circular transversal-sectioned type and are made from a flexible material, for example, an elastomeric material.

The body 3 of the screw is endowed with a central conduit 15 that communicates with the internal space 16 of the mobile joint 1 through at least one transversal hole 17. In turn, the internal space 16 connects to the tubular body 18 which is connected to the joint 1.

As one will appreciate from all that is herein described or illustrated, all of the components of the fluid connector herein are pre-assembled and as regards installation, it is sufficient to screw part number 5 into the corresponding threaded hole from which comes, or into which flows, fluid for the purpose of transportation.

During installation all of the components of the fluid connector herein remain in their aligned positions and, to complete the coupling, it is sufficient to merely tighten to the point where the elastic ring 9 becomes squeezed and compressed between its seat 8 and the lower surface 13 of the head 4 and the elastic ring 9' becomes squeezed and compressed between its seat 8 and the surface (not illustrated) to which the mobile joint is to be joined.

In this manner, the fluid-tightness of the connector herein is assured as are the connections of the communicating parts. Furthermore, the installation of the fluid connector of the present invention is rendered simple, rapid and secure.

What is claimed is:

1. A fluid connector provided as a pre-assembled unit which comprises:

(a) a bored mobile joint possessing an internal chamber communicating with a tubular conduit and upper and lower coaxial, opposed bore-holes whose common axis is substantially perpendicular to said tubular conduit;

(b) a screw brace having a head portion and a leg portion, the leg portion being inserted with said bore-holes, the leg portion of said screw brace possessing an internal conduit which is co-axial with the common axis of the bore-holes and which communicates with said internal chamber, said leg portion further possessing upper and lower annular grooves and a threaded portion starting below the lower annular groove;

(c) a metallic retaining ring disposed within the upper annular groove, said metallic retaining ring being positioned below the upper bore-hole; and, (d) upper and lower flexible, elastomeric sealing rings, the upper of said rings being seated within a housing defined upon the upper side of the upper bore-hole and the lower of said rings being partly seated within a housing defined upon the lower side of the lower bore-hole and partly within said lower annular groove.

* * * * *